United States Patent

[11] 3,549,895

[72] Inventor Raymond C. Sidorsky
Society Road, Lyme, Conn. 06333
[21] Appl. No. 778,254
[22] Filed Nov. 22, 1968
[45] Patented Dec. 22, 1970

[54] DEVICE FOR ILLUMINATING DISCRETE DATA BEARING AREAS OF A RECORD SHEET
14 Claims, 7 Drawing Figs.

[52] U.S. Cl. .......... 250/219, 235/61.115; 250/227; 346/104
[51] Int. Cl. .......... G01n 21/30
[50] Field of Search .......... 250/219IDC, 227; 235/61.115; 346/104, (Inquired)

[56] References Cited
UNITED STATES PATENTS

| | | | |
|---|---|---|---|
| 2,964,374 | 12/1960 | Miller | 346/104X |
| 3,036,765 | 5/1962 | Jones et al. | 250/219IDCX |
| 3,201,038 | 8/1965 | Harris | 346/104X |
| 3,213,179 | 10/1965 | Clauson | 250/219IDCX |
| 3,229,075 | 1/1966 | Palti | 250/227UX |
| 3,328,589 | 6/1967 | Ferguson, Jr. | 250/219IDC |
| 3,351,950 | 11/1967 | Wolfe | 346/104 |
| 1,294,248 | 2/1919 | Dunhill | 346/104 |

OTHER REFERENCES
Rohland, " Sensing Apparatus," IBM Technical Disclosure Bulletin, Vol. 7, No. 6, Nov. 1964, pp. 476— 77

*Primary Examiner*—James W. Lawrence
*Assistant Examiner*—Charles M. Leedom
*Attorney*—McCormick, Paulding & Huber

ABSTRACT: A device for use with record sheets of the type adapted to have data recorded thereon by marking discrete data bearing areas thereof in binary form, by applying appropriate marking material to the sheet in accordance with a predetermined code, consists of a support plate having a bearing surface for receiving and supporting a record sheet and having a plurality of discrete areas distributed over such bearing surface to which light is transmitted from a source located on the opposite side of the plate. The light appearing at these discrete areas of the supporting surface passes through the record sheet supported thereon and creates illuminated visible indications of the data bearing areas of the sheet. In cases where the record sheet is marked by applying an opaque ink or other opaque marking material to selected ones of the data bearing areas the device may also be used as a reader for retrieving recorded information from the record sheet by associating a photosensitive detector with each of the discrete areas of the supporting surface and illuminating the record sheet from a light source facing the supporting surface so that the amount of light passing through each data bearing area of the card is sensed by said detectors.

INVENTOR.
RAYMOND C. SIDORSKY

BY

McCormick, Paulding & Huber
ATTORNEYS

DEVICE FOR ILLUMINATING DISCRETE DATA BEARING AREAS OF A RECORD SHEET

BACKGROUND OF THE INVENTION

This invention relates to devices for use with record cards, tapes and other sheet type records wherein information is recorded on the record sheet by applying or not applying marking material to certain data bearing areas of the sheet in accordance with a predetermined code, and deals more particularly with such a device which is used with such a record sheet to create illuminated areas on the surface of the record sheet, which illuminated areas indicate or define the data bearing areas, and/or to retrieve information from a marked record sheet by sensing the amount of light passing through each data bearing area thereof.

The device of this invention is of particular utility when used in association with a record sheet such as shown in my copending patent application entitled "Data Recording and Retrieval Method and Record Sheet for Use Therein," wherein a relatively opaque marking material is applied to data bearing areas which are initially relatively transparent and surrounded by opaque areas so that after the record sheet is marked the condition of each data bearing area thereof may be determined by detecting the amount of light transmitted through each data bearing area from a source positioned on one side of the sheet.

In the past, record sheets adapted to be marked by hand have required printing or some other means to visually delineate the various data bearing areas and the means used have often not produced quickly perceptible indications of the areas. The device of this invention, however, creates highly visible indications of data bearing areas on record sheets which may be otherwise undifferentiated. That is, the record sheets prior to marking may be plain sheets without data bearing area markings of any sort. When placed on the device of this invention, the data bearing areas of the record sheets are made visible during the marking process by means of dots or areas of light which define such data bearing areas. These dots or areas of light not only serve to define the data bearing areas and act as guides in the marking process but also provide an immediate direct feedback to the user regarding the completeness of the coverage of the marked data bearing areas with the marking material. That is, as any one data bearing area is marked the adequacy of the marking is readily apparent to the user in that if any light shines through the area after marking the user knows the marking is not satisfactory, and he may thereupon remark the area to correct the situation.

In addition to being used as a device for marking record sheets the device of this invention may also be used as a device for reading marked record sheets by constructing it to include a photodetector associated with each of the discrete areas of its supporting surface so that when a light source is placed above the surface and a marked sheet received thereon, the condition of each data bearing area of the record sheet is determined by the amount of light detected by each photodetector.

The general object of the invention therefore is to provide a device which may be used to permit the simple and easy entry of data onto record sheets which may, if desired, be undifferentiated to render the data bearing areas highly visible to the user, to provide an indication as to the adequacy of the markings applied to the record sheet and/or to serve as a readout device for retrieving information from a marked record sheet. It should be understood, however, that although the device of this invention may be used with undifferentiated record sheets its use is not limited thereto. If desired, the record sheets may also include printed markings or the like defining the data bearing areas with the device serving primarily, at least with regard to the definition of the data bearing areas, to render such areas more distinct and readily visible to the user.

SUMMARY OF THE INVENTION

The invention resides in a device having a bearing surface for supporting a record sheet and which surface includes a large number of discrete areas or dots distributed thereover. Means are included in the device for supplying light to each of these discrete areas so as to be radiated outwardly therefrom, with the bearing surface outside of such discrete areas being unilluminated. Therefore, when a relatively transparent or translucent record sheet is supported on the bearing surface the light radiated from its discrete areas passes through the record sheet and visibly marks or defines, by areas of light, a corresponding number of discrete data bearing areas on the record sheet. Registration means register the sheet with the discrete areas of the bearing surface and accurately locate the data bearing areas relative to some reference on the sheet. Additionally, the invention also resides in providing a photodetector for each of the discrete areas of the bearing surface for detecting the amount of light passing from an external source through a supported record sheet at the location of each discrete area, so that by illuminating the exposed face of a marked record sheet supported on the bearing surface the information recorded on such sheet may be read by utilizing the signals derived from the photodetectors.

DESCRIPTION OF THE PREFERRED EMBODIMENTS

Figure 1:
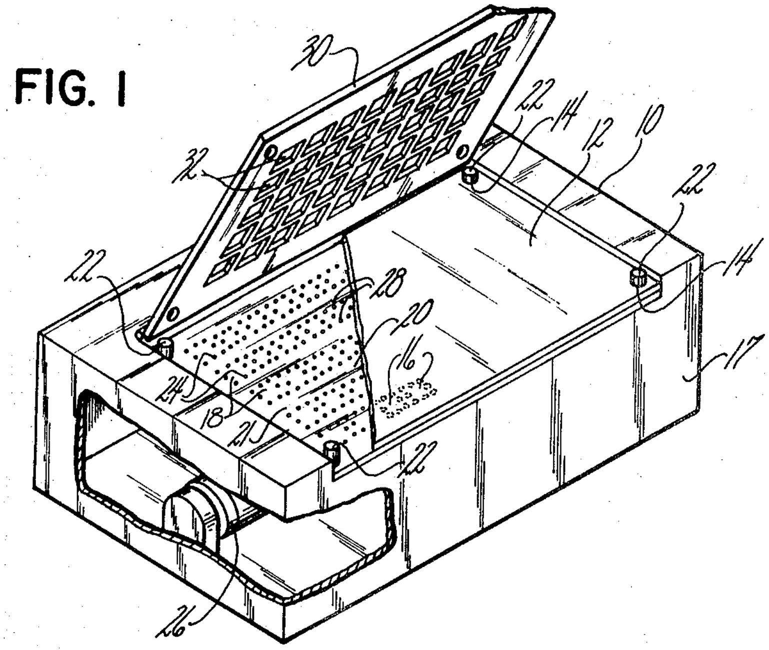
FIG. 1 is a perspective view of a device embodying this invention with the marking template of the device being shown in a raised position and with the record sheet supported on the bearing surface being shown fragmentarily.
Figure 2:
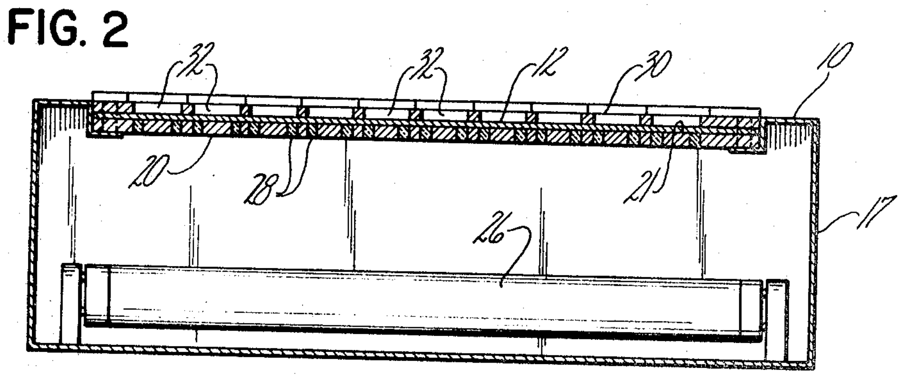
FIG. 2 is a vertical sectional view taken through the top portion of the device of FIG. 1 with the record sheet being shown in place and with the template being shown in its lowered position.

Turning first to FIGS. 1 and 2 of the drawings, these FIGS. show a device 10 embodying this invention and adapted primarily for use in marking record sheets or cards, such as the one shown at 12, having discrete data bearing areas distributed over the face thereof and which record bearing areas are intended to be marked with a marking material in accordance with a predetermined code to record desired information on the sheet. The record sheet 12 may take various different forms without departing from the invention and in the present instance is shown to be of a generally rectangular shape with four registration openings 14, 14 located respectively at its four corners. The sheet 12 is preferably made of a relatively transparent or translucent material, such as paper or thin cardboard, so as to be relatively light transmitting, and at least is relatively light transmitting at each of its data bearing areas which are indicated at 16, 16. The marking material used to mark the sheet is also preferably an opaque ink or the like so that after a data bearing area is marked its light transmissibility is drastically reduced so that the condition of each data bearing area, either marked or unmarked, may be readily determined thereafter by detecting the amount of light transmitted through the area from a light source located on one side of the sheet. The arrangement of the data bearing areas 16, 16 may take various different forms depending on the code or marking system utilized in conjunction with the record sheet 12, and in the present case they are shown to be arranged in accordance with the scheme illustrated and described in my copending patent application entitled "System For the Entry and Machine Recognition of Data Characters." That is, the data bearing areas 16, 16 are arranged to form matrices or arrays 18, 18 of eight data bearing areas each, with each matrix or arrays being intended to receive one letter, numeral or other character written in accordance with a predetermined code so as to mark certain selected ones of the data bearing areas of the matrix, the pattern or combination of marked and unmarked areas of the matrix thereafter serving to establish the identity of the entered symbol. It should be understood, however, that this arrangement of data bearing areas is not essential and any other arrangement of such areas may be used without departing from this invention.

Considering more specifically the construction of the device 10 of FIGS. 1 and 2, as shown best in FIG. 1, it consists essentially of a generally enclosed housing 17 having a top plate 20 which includes a flat upwardly directed bearing surface 21 for receiving and supporting an associated record sheet such as the sheet 12. Registration pins 22, 22 are fixed to the plate 20 and pass with a close fit through the openings 14, 14 of the record sheet to accurately locate it relative to any given point on the surface 21.

The bearing surface 21 is divided into a large number of discrete areas 24, 24 which are distributed thereover and which correspond in location and arrangement with the data bearing areas 16, 16 which it is desired to define or illuminate on the supported record sheet 12. In accordance with the invention, means are provided for illuminating each of the individual discrete areas 24, 24 so that light is radiated outwardly therefrom or upwardly in FIG. 1. If the record sheet is sufficiently stiff and the discrete areas 24, 24 sufficiently small, so that the record sheet does not unduly deform as a marking implement passes over the discrete areas, the discrete areas may consist merely of holes in the plate 20 with the plate being made from an opaque material such as sheet metal. In this case, each hole forms one of the discrete areas and the illumination of the discrete areas may be accomplished by providing one or more lamps within the housing 17, such as the fluorescent lamp 26 shown in FIG. 1. Preferably, however, and as shown in FIG. 2, the plate 20 is made primarily of an opaque material and each discrete area 24, 24 is defined by a transparent plug 28 passing through such material. This construction may be achieved by starting with a sheet of opaque material such as opaque plastic, drilling it to form holes at the desired discrete areas, filling in the holes with a liquid transparent plastic material, and then curing the liquid plastic to a hardened state with the entire bearing or supporting surface 21 thereafter being ground or otherwise finished to form a smooth hard surface. In this case a lamp such as shown at 26 in FIG. 2 is also used to provide the source of light for illuminating the discrete areas, the light from the lamp 26 passing through the transparent plugs 28, 28 to the bearing surface 21 and radiating outwardly therefrom.

Also as shown in FIG. 1 the device 10 includes a template 30 which is hinged to the housing 17 along one edge of the bearing surface 21 so to be movable between a raised and a lowered position relative to the bearing surface. In its raised position the template permits the removal and replacement of record sheets and in its lowered position, as shown in FIG. 2, it serves as a guide for aiding in the marking of the record sheet received on the bearing surface. That is, the template 30 includes a number of openings 32, 32 each of which, when the template is in its lowered position surrounds a respective one of the matrices 18, 18 and acts to provide a restraining wall to guide the writing implement in marking the matrix and to prevent it from wandering into an adjacent matrix.

From the foregoing consideration of FIGS. 1 and 2, it is apparent that when a record sheet is received on the bearing surface 21 and the lamp 26 lighted light from the lamp will pass through the transparent plugs 28, 28 and illuminate the discrete areas 24, 24 defined by the plugs. This illumination in turn, illuminates the underside of the record sheet 12 and by virtue of the light transmissibility of the record sheet causes visibly illuminated areas to appear on its upper surface. These illuminated areas on the upper surface of the record sheet correspond with or define the data bearing areas of the card and therefore permit and/or aid in the marking of the card. Also, as marking material is applied over a given data bearing area the light transmitted therethrough is reduced so that by inspecting a data bearing area immediately after marking a user can readily determine whether the marking is sufficient by noting whether any light shines through the marked area. If it is noted that some light does shine through, additional marking material thereafter may be applied to the area to correct the situation. The illumination of the data bearing areas therefore provides a form of direct feedback to the user to indicate the adequacy of the marking.

Figure 4:
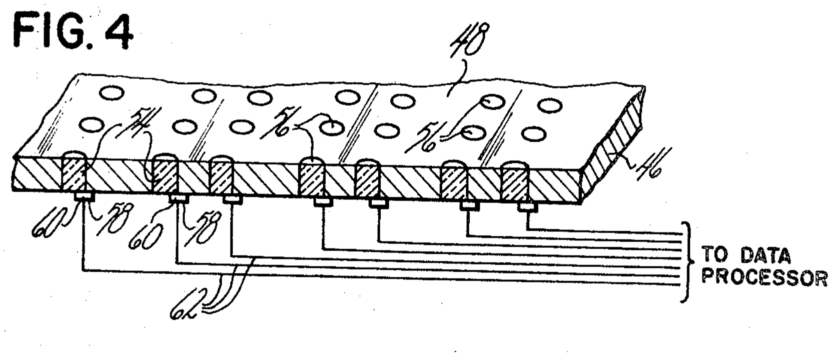
FIG. 4 is a fragmentary perspective view of the top portion of the FIG. 3 device showing the photodetectors associated with the discrete areas of the bearing surface.
Figure 3:
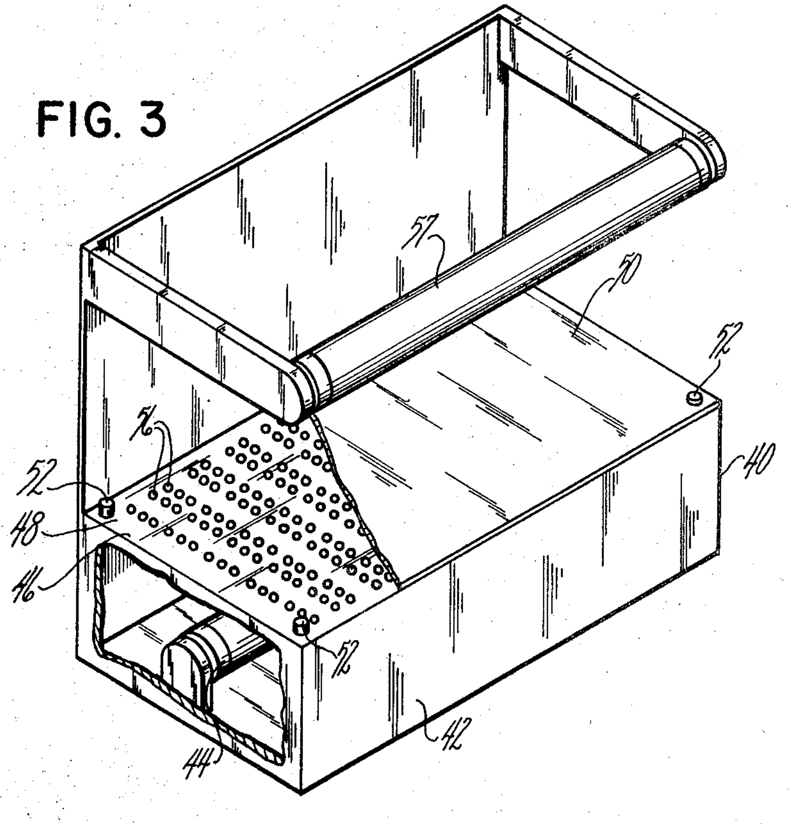
FIG. 3 is a perspective view of another device embodying this invention and adapted to be used both for marking and reading record sheets.

In addition to being used solely as a device for marking of record sheets, the basic device of this invention may also be used for retrieving information from marked record sheets or as both a marking and a reading or retrieval device. Referring to FIGS. 3 and 4, these FIGS. show a device so embodying this invention and adapted for both sheet marking and reading. Considering first FIG. 3, the device 40 there shown includes a housing 42 which contains as a light source a fluorescent lamp 44. The top of the housing 42 is defined by a plate 46 having a flat upwardly facing surface 48 which serves as a bearing surface for receiving and supporting a record sheet 50. Registration pins 52, 52 are provided at the four corners of the plate 46 for cooperation with corresponding openings in the record sheet to properly register the sheet with the surface 48. As shown also in FIG. 4, the plate 46 is made primarily of an opaque material and includes a plurality of transparent plugs 54, 54 which define discrete areas 56, 56 on the surface 48 and transmit light from the lamp 44 to the surface 48, for illuminating the undersurface of the record sheet 50. As so far described the device 40 of FIGS. 3 and 4 is essentially similar to the device 10 of FIGS. 1 and 2, except for not including a marking template which is an optional feature and has been omitted in FIG. 3 for clarity. When used as a record sheet marking device the device 40 is used in the same manner as the device 10 of FIGS. 1 and 2 by lighting the lamp 44 to illuminate the data bearing areas of the record sheet and thereby render them visible to the user. For use as a record sheet reading or information retrieval device, however, the device 40 further includes a second lamp 57 located outwardly of the supporting surface 48, or above the surface as shown in FIG. 3. Additionally, as shown in FIG. 4, each discrete area 56 of the supporting surface 48 has associated with it a photodetector 58 responsive to the light passing through such discrete area from the bearing surface 48. As shown in FIG. 4 each photodetector 58 comprises a small photodiode 60 fixed to the undersurface of the plate 46 and covering a small portion of the bottom area of the associated transparent plug 54. The arrangement and size of each photodiode 60 relative to its associated plug 54 is such as not to substantially interfere with the passage of light from the lower fluorescent lamp 44 to the upper surface of the plug during use of the device as a marking implement, but nevertheless, the photodiode does cover a sufficient area of the bottom surface of the plug so as to be sensitive to light passing through the plug and the record sheet from the upper fluorescent lamp 57. Attached to each photodiode 60 is a lead 62 which transfers signals from the photodiode to an associated data processor or the like.

Therefore, when using the device 40 of FIGS. 3 and 4 as a reading device, the lamp 47 is turned off and the lamp 57 is turned on to provide a strong source of light located beyond the exposed face of the record sheet 50 received on the bearing surface 48 and directing rays of light toward such record sheet and the bearing surface 48. At the unmarked data bearing areas of the record sheet light from the lamp 57 will pass through the card and through the underlying transparent plugs 54, 54 to produce signals from the associated photodiodes 60, 60 indicating the presence of a relatively high amount of light at each such plug. Contrarily, at the marked areas of the card the marking material applied to such areas prevents light from the lamp 57 from passing through the card, and accordingly little or no light will be received by the associated plugs and the associated photodiodes 60, 60 will produce signals indicating a relatively low amount of light at such plugs. Accordingly, the signals produced from the various diodes 60, 60 may be used to indicate the condition, marked or unmarked, of the associated data bearing areas of the record sheet 50 and these signals in turn may be used by an associated data processor as representative of the information contained on the sheet.

Figure 5:
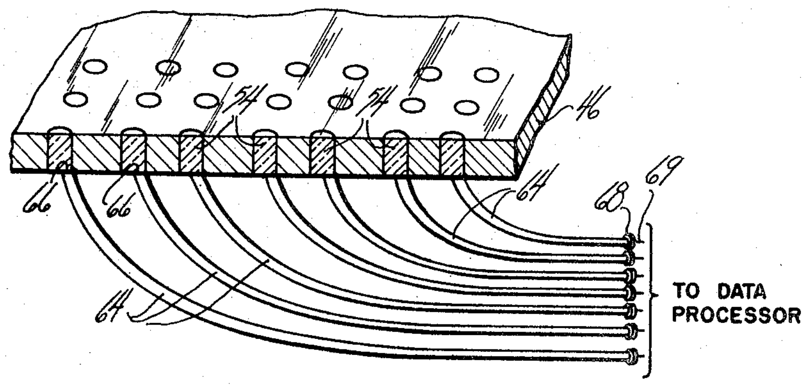
FIG. 5 is a view similar to FIG. 4 but shows a device comprising still another embodiment of the invention and having a different form of photodetector associated with each discrete area of its bearing surface.

FIG. 5 is a fragmentary view similar to FIG. 4 but shows an alternative way of detecting the light passing through each transparent plug 54 during the reading process. In this case the light detecting means consists of a plurality of fiber optic bundles 64, 64 each associated with a respective one of the plugs 54, 54 and having one end 66 arranged to receive light from a small area of the bottom surface of the associated plug. This fiber optic bundle conducts light from the associated plug to a remote photodiode or other photodetector 68 operatively associated with its other end, the various photodetectors 68, 68 being located preferably in a group to one side of the plate 46 or at some other common remote location. Each photodetector in turn has a lead associated therewith on which signals appear representing the amount of light detected and transmitted to an associated data processor or the like.

Figure 7:
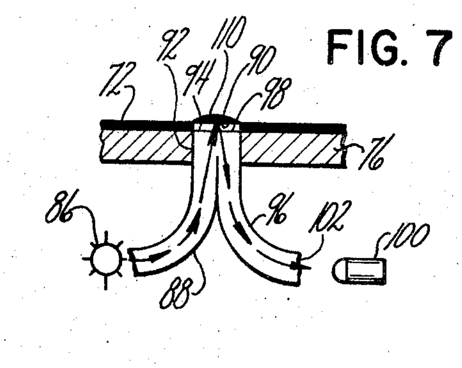
FIG. 7 is a fragmentary, somewhat schematic view showing the illuminating and detecting means associated with one of the discrete areas of the bearing surface of the device of FIG. 6.
Figure 6:
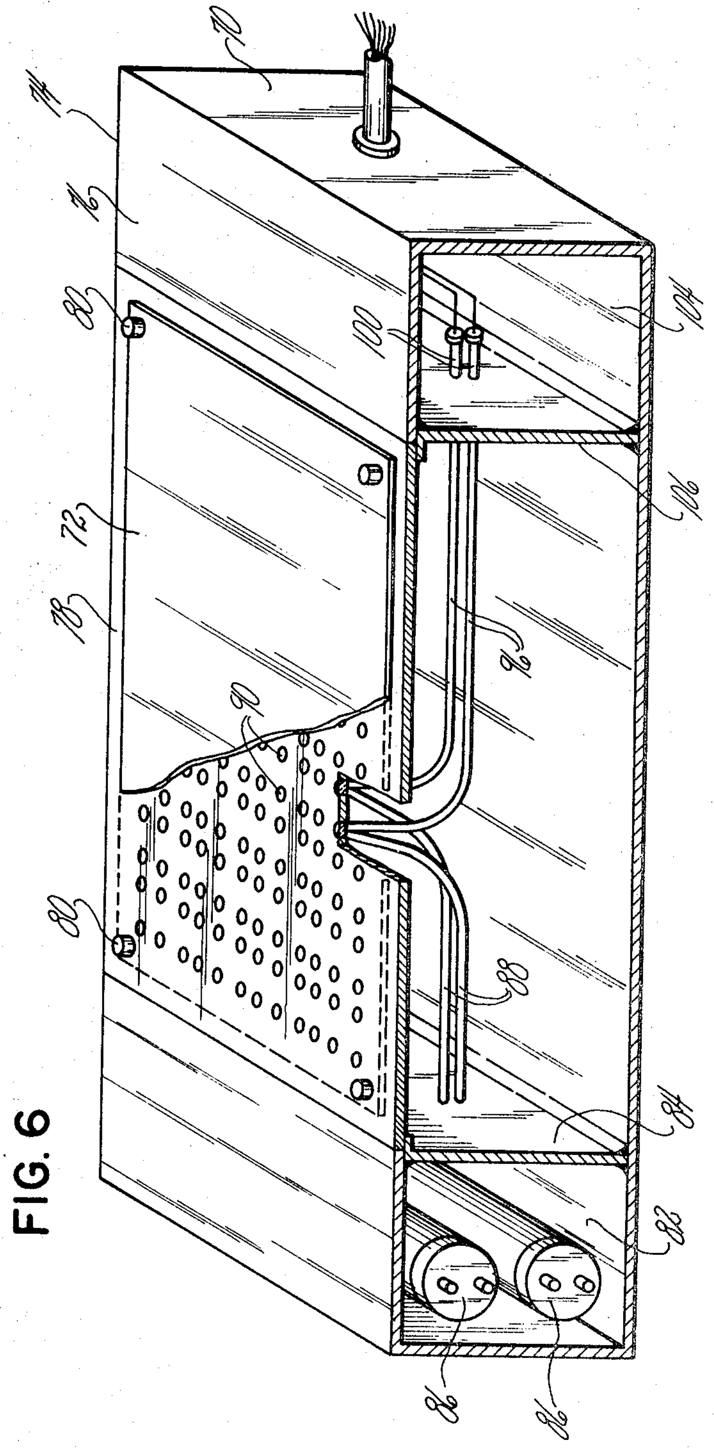
FIG. 6 is a perspective view of a device comprising still another embodiment of this invention and which device is adapted to be used both for marking and reading record sheets.

FIGS. 6 and 7 show a device 70 embodying this invention usable both for marking an associated record sheet 72 and for reading or retrieving information from such a sheet, the device 70 utilizing fiber optic elements both for the illumination and the interrogation of the discrete areas of the bearing surface and also utilizing the same light source for the marking process as used for the reading or retrieval process. Referring first to FIG. 6 the device 70 there illustrated includes a generally enclosed housing 74 having a top plate 76 providing a flat bearing surface 78 for receiving and supporting the record sheet 72. Registration pins 80, 80 cooperate with openings in the record sheet to properly register the sheet relative to the surface 78 both during marking and reading thereof. At one end of the housing 74 is a compartment 82, defined in part by a vertical wall 84, containing two fluorescent lamps 86, 86. Passing through the wall 84 are a plurality of fiber optic bundles 88, 88 each having the end thereof which passes through the wall 84 exposed to the light produced by the fluorescent lamps 86, 86. Each fiber optic bundle 88 in turn passes from the wall 84 to a respective one of the discrete areas 90, 90 of the supporting surface 78. As shown best in FIG. 7 the plate 76 is made of an opaque material and is drilled at each discrete area 90 to provide an opening 92. One of the fiber optic bundles 88 from the light source or lamps 86, 86 passes through each of the openings 92 and has its adjacent end surface 94 located in the plane of the bearing surface 78. Therefore, during marking of the record sheet 72 the end surfaces 94, 94 of the various fiber optic bundles 88, 88 emit or radiate light from the bearing surface 78 to illuminate the undersurface of the record sheet and thereby define or make more visible the data bearing areas of the record sheet.

For the purpose of retrieving information from marked record sheets, the device 70 further includes a plurality of other fiber optic bundles 96, 96 each associated with a respective one of the discrete areas 90, 90 of the bearing surface 78. As shown best in FIG. 7, which shows the construction at one of the discrete areas, the second fiber optic bundle 96 also passes through the associated opening 92 and has an end surface 98 flush with the remaining portion of the bearing surface. The two bundles 88 and 96 therefore share the same opening 92 in the plate 76 and each occupies approximately one half of the opening. The opposite end of each bundle 96 in turn has associated therewith an individual photodetecting element 100 which provides an output signal related to the amount of light appearing at the associated end 102. As shown best in FIG. 6 the housing 70 preferably includes another compartment 104 at its other end, defined in part by a vertical wall 106 which supports the photodetectors 100, 100 and receives the associated ends of the fiber optic bundles 96, 96. Leads connected with the individual photodetectors 100, 100 conduct the signals produced thereby to an associated data processing device.

The device of FIGS. 6 and 7 when used as a reading or retrieval device is intended to be used with a record sheet, such as shown at 72, wherein the data bearing areas have one degree of light reflectivity when unmarked and a substantially different degree of light reflectivity when marked. For example, the card may be one having a relatively nonreflective mark receiving surface, both within and surrounding the data bearing areas thereof, with the marking material applied to the data bearing areas having a relatively high degree of light reflectivity so that after such marking material is applied to a data bearing its light reflectivity is changed from a low to a high value. In the illustrated case, however, the card or sheet 72 is one which is relatively transparent at the data bearing areas and which may be rendered light reflecting by applying a reflective ink, such as shown at 110 in FIG. 7, over the exposed portion of the card to render it light reflecting. Therefore, as shown in FIG. 7, and as indicated by the arrows therein which show the direction of the light rays, when a quantity of light reflecting ink 110 appears at a data bearing area of the card 72 light from the light source 86 passes through the associated first fiber optic bundle 88 to the data bearing area at such data bearing area is reflected by the reflective ink 110 back toward the second fiber optic bundle 96 which conducts it to the associated photodetector 100 to provide a signal indicating the presence of a mark at the data bearing area. Likewise, it will be appreciated from FIG. 7 that if the reflective ink 110 is absent from the card 72 at the illustrated data bearing area light from the light source 86 after passing to the data bearing area through the first fiber optic bundle 88 will be transmitted through the transparent data bearing area of the sheet and will pass through the outer surface of the sheet without any substantial portion thereof being reflected back to the second fiber optic bundle 96, thereby producing an output signal from the associated photodetector 110 indicating the absence of a mark at the associated data bearing area.

I claim:

1. A device for illumination discrete data bearing areas of a record sheet which is relatively light transmitting at least within each of said data bearing areas, said device comprising a support plate having a bearing surface for receiving and supporting a record sheet placed thereon, said bearing surface including a plurality of discrete areas grouped into at least one array and said device providing a free space outwardly beyond said bearing surface to allow access to a record sheet placed thereon by a writing implement used to mark data characters on said record sheet, a light source, and means for transmitting light rays from said light source to said plurality of discrete areas of said bearing surface so as to radiate light from each of said discrete areas and illuminate corresponding areas on the outer face of the record sheet positioned on said bearing surface by transmission of light through said record sheet from said discrete areas of said bearing surface to said outer face of said record sheet, said discrete areas of said at least one array being arranged relative to one another so that said corresponding areas of said record sheet collectively define a larger two-dimensional area adapted to receive the entry by a writing implement of a two-dimensional data character crossing certain ones of said corresponding areas, and said means for transmitting light rays from said light source to said plurality of discrete areas being adapted to simultaneously illuminate all of said discrete areas of said at least one array so that all of said corresponding areas of said outer face of said record card are simultaneously illuminated to visually delineate the same as an aid to entering a data character into said larger two-dimensional area.

2. A device as defined in claim 1 further characterized by said plurality of discrete areas being grouped into a plurality of separate arrays each of which arrays has its discrete areas arranged relative to one another so that corresponding areas of said outer face of said record sheet collectively define a larger two-dimensional area such as aforesaid, a marking template, and means supporting said marking template for movement between a first position at which it overlies said bearing surface and any record sheet positioned thereon and a second position at which it is removed from said overlying relationship with said bearing surface to permit the removal and replacement of record sheets relative to said bearing surface, said template including a plurality of openings each of which surrounds a corresponding one of said larger two-dimensional areas of the record sheet positioned on said bearing surface to provide a guide wall around said latter two-dimensional area, at least some of said discrete areas associated with each of said template openings being positioned adjacent said guide wall so that as a writing implement is moved along said guide wall in forming portions of a data character it is inherently guided over such discrete areas and the corresponding areas of said outer face of said record sheet.

3. A device as defined in claim 1 further characterized by a housing of which said support plate forms a part, said light source comprising at least one lamp within said housing arranged when lighted to simultaneously illuminate the inside surface of said support plate at the location of each of said discrete areas of said at least one array, and said means for transmitting light rays from said light source to said discrete areas comprising means providing said support plate with a relatively high light transmissivity at the location of each of said discrete areas and a relatively low light transmissivity at the areas thereof surrounding said discrete areas.

4. A device as defined in claim 1 further characterized by a plurality of sensing means each associated with a respective one of said discrete areas and arranged to sense a characteristic representative of the presence or absence of marking material at the corresponding data bearing area of the record sheet received on said bearing surface.

5. A device as defined in claim 4 further characterized by said plurality of sensing means being a plurality of light sensing means each associated with a respective one of said discrete areas and arranged to sense the amount of light passing through such discrete areas from a source located outwardly beyond said bearing surface.

6. A device as defined in claim 3 further characterized by said means providing said support plate with a relatively high light transmissivity at each of said discrete areas comprising a slug of relatively transparent material passing through said support plate at each of said discrete areas, said support plate being made of a relatively opaque material in the areas surrounding said slugs, said slugs having end surfaces located in the plane of and forming a part of said bearing surface so that said bearing surface is continuous along lines thereon passing across said discrete areas.

7. A device as defined in claim 1 further characterized by said means for transmitting light rays from said light source to said discrete areas comprising a plurality of fiber optic bundles each of which bundles has one end face thereof exposed to said light source and its other end face located at a respectively associated one of said discrete areas so as to radiate light energy outwardly therefrom.

8. A device as defined in claim 7 further characterized by said plate having an opening at each of said discrete areas and the one of said fiber optic bundles associated with such discrete area passing through said opening and having its said other end face arranged flush with the remainder of said bearing surface.

9. A device as defined in claim 7 further characterized by a second plurality of fiber optic bundles, each of the bundles of said second plurality having one end face located at a respective one of said discrete areas so as to be exposed to light rays directed toward said discrete area, and a plurality of photodetectors, each of said bundles of said second plurality having its other end face located adjacent a respective one of said photodetectors so that said photodetector provides a signal related to the amount of light directed toward the associated discrete area.

10. A device as defined in claim 9 further characterized by said plate having an opening therethrough at each of said discrete areas and the one of said fiber optic bundles associated with such discrete area passing through said opening and having its said other end face arranged flush with the remainder of said bearing surface, the one bundle of said second plurality associated with said latter discrete area also passing through said opening and having its said one end face arranged flush with the remainder of said bearing surface.

11. A device as defined in claim 1 further characterized by means engageable with a record sheet received on said bearing surface for registering it relative to said bearing surface to bring predetermined areas of said record sheet into register with said discrete areas of said bearing surface.

12. A device as defined in claim 5 further characterized by at least one lamp located outwardly beyond said bearing surface for providing radiant energy rays directed toward said bearing surface and any record sheet placed thereon so as to simultaneously irradiate all those areas of such record sheet overlying said discrete areas of said bearing surface.

13. A device as defined in claim 1 further characterized by said plurality of discrete areas being grouped into at least one array which array has its discrete areas arranged relative to one another so that corresponding areas of said outer face of said record sheet collectively define a larger two-dimensional area such as aforesaid, and a marking template connected with said support plate and having at least one position at which it overlies said bearing surface and any record sheet positioned thereon, said template including an opening which surrounds said larger two-dimensional area of the record sheet positioned on said bearing surface to provide a guide wall around said latter two-dimensional area, at least some of said discrete areas associated with said template opening being positioned adjacent said guide wall so that as a writing implement is moved along said guide wall in forming portions of a data character it is inherently guided over such discrete areas and a corresponding areas of said outer face of said record sheet.

14. A device for illuminating discrete data bearing areas of a record sheet which is relatively light transmitting at least within each of said data bearing areas, said device comprising a support plate having a bearing surface for receiving and supporting a record sheet placed thereon, said bearing surface including a plurality of discrete areas grouped into at least one array and said device providing free access to a record sheet placed thereon by a writing implement used to mark data representations on said sheet, a first source of radiant energy which radiant energy includes visible light rays, means for transmitting light rays simultaneously from said first source to said plurality of discrete areas of said bearing surface so as to radiate light from each of said discrete areas and illuminate corresponding areas on the outer face of the record sheet positioned on said bearing surface by transmission of light through said record sheet from said discrete areas of said bearing surface to said outer face of said record sheet, a second source of radiant energy, means for transmitting radiant energy from said second source to said discrete areas of said bearing surface, and a plurality of radiant energy sensing means each associated with a respective one of said discrete areas and arranged to sense radiant energy derived from said second source and directed toward said discrete area.